United States Patent

[11] 3,532,191

| [72] | Inventors | Richard T. Burnett;<br>Alfred Wesstrom, South Bend, Indiana |
|---|---|---|
| [21] | Appl. No. | 772,331 |
| [22] | Filed | Oct. 31, 1968 |
| [45] | Patented | Oct. 6, 1970 |
| [73] | Assignee | The Bendix Corporation<br>a corporation of Delaware |

[54] ADJUSTABLE BEARING MEANS FOR A DISC BRAKE
10 Claims, 8 Drawing Figs.

[52] U.S. Cl. ................................................. 188/71.3
188/196, 188/71.8, 188/264
[51] Int. Cl. ................................................. F16d 55/224
[50] Field of Search ........................................... 188/73,
73(CL), 73(C), 196(P), 264.1

[56] References Cited
UNITED STATES PATENTS

| 1,511,951 | 10/1924 | Diller | 188/264.1UX |
|---|---|---|---|
| 2,531,341 | 11/1950 | Meader | 188/72(C) |
| 2,938,609 | 5/1960 | Burnett | 188/73 |
| 3,388,774 | 6/1968 | Burnett | 188/73(C) |

*Primary Examiner*—George E. A. Halvosg
*Attorneys*—C. F. Arens and Plante, Arens, Hartz and O'Brien

ABSTRACT: A disc brake wherein a housing which straddles a rotor is slidingly carried by a torque taking member with the friction lining members being closely maintained adjacent the rotor surfaces. A bearing means cooperates with the housing and torque taking member to adjust said housing upon friction pad wear or other causes of lateral displacement of the housing.

Patented Oct. 6, 1970
3,532,191
Sheet 1 of 5
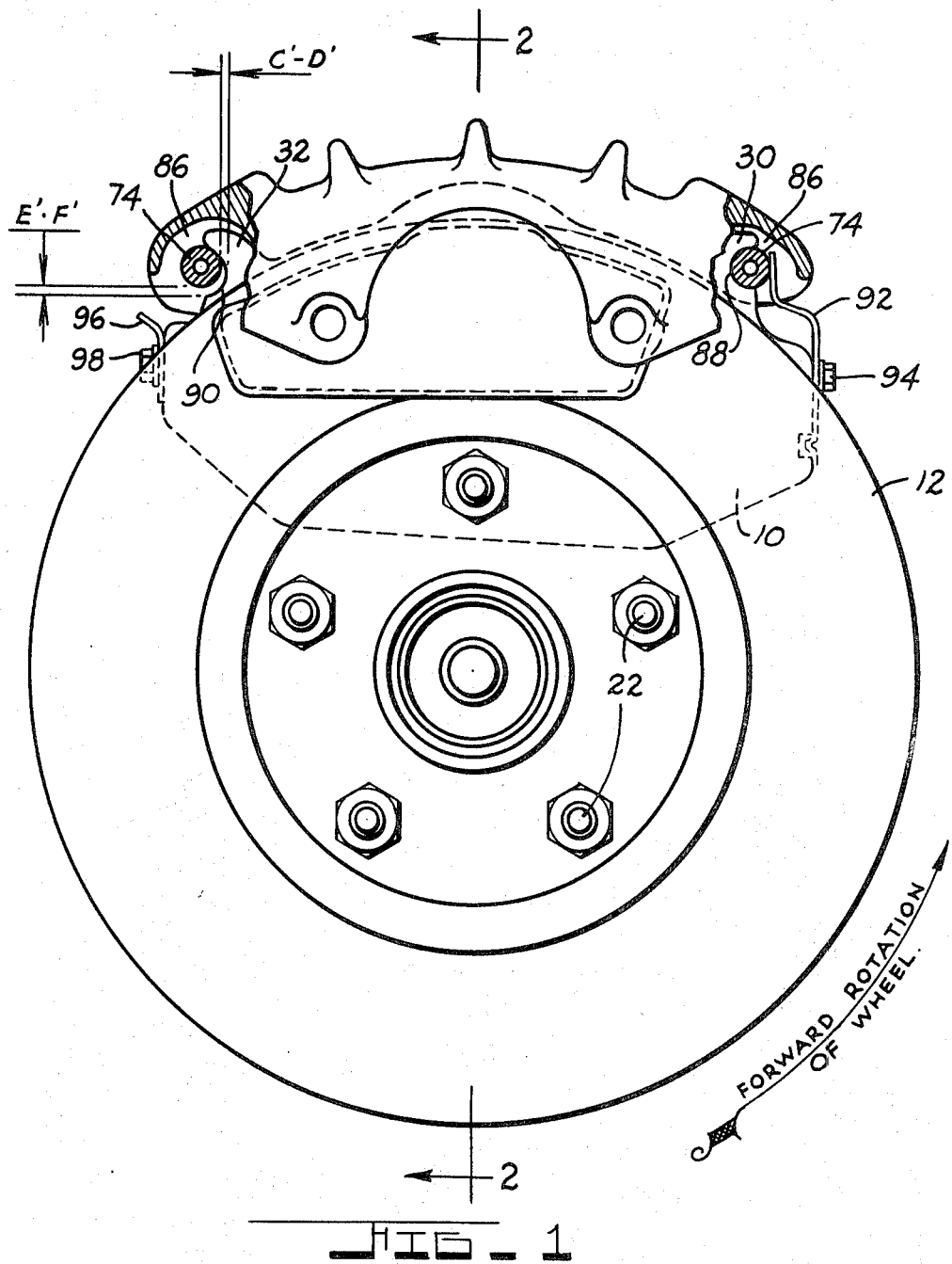
FIG_1
INVENTORS
RICHARD T. BURNETT.
ALFRED WESSTROM.
BY
Plante, Arens, Hartz and O'Brien
ATTORNEY.

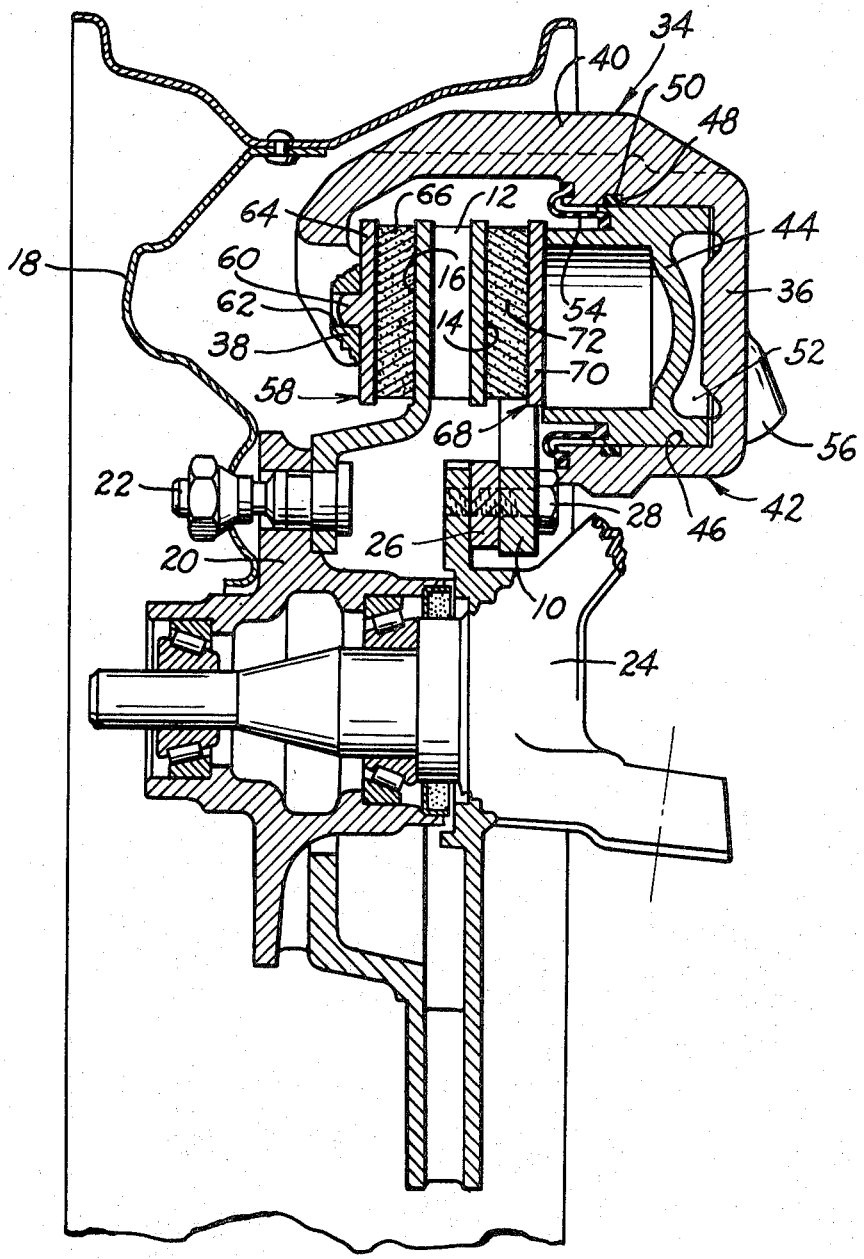
FIG_2
INVENTORS
**RICHARD T. BURNETT.
ALFRED WESSTROM.**
ATTORNEY.

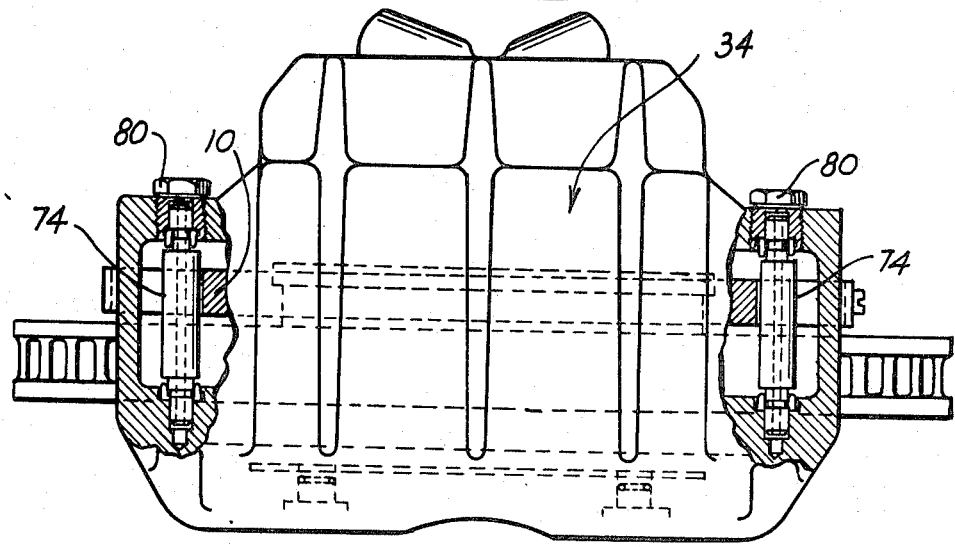
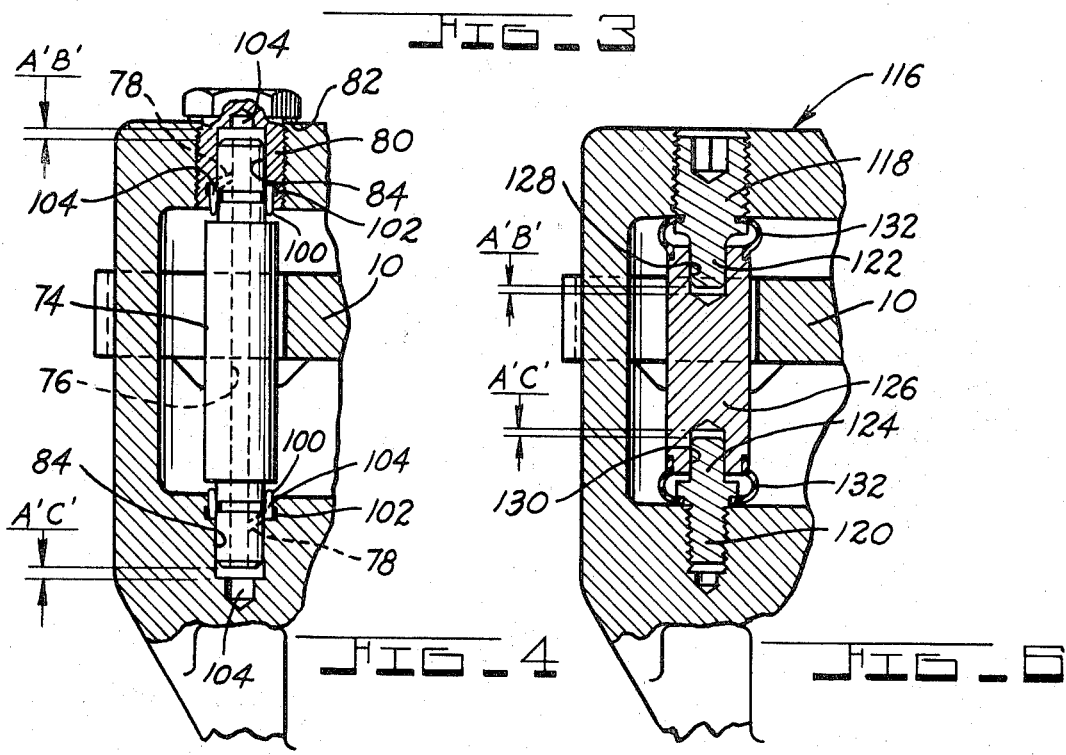

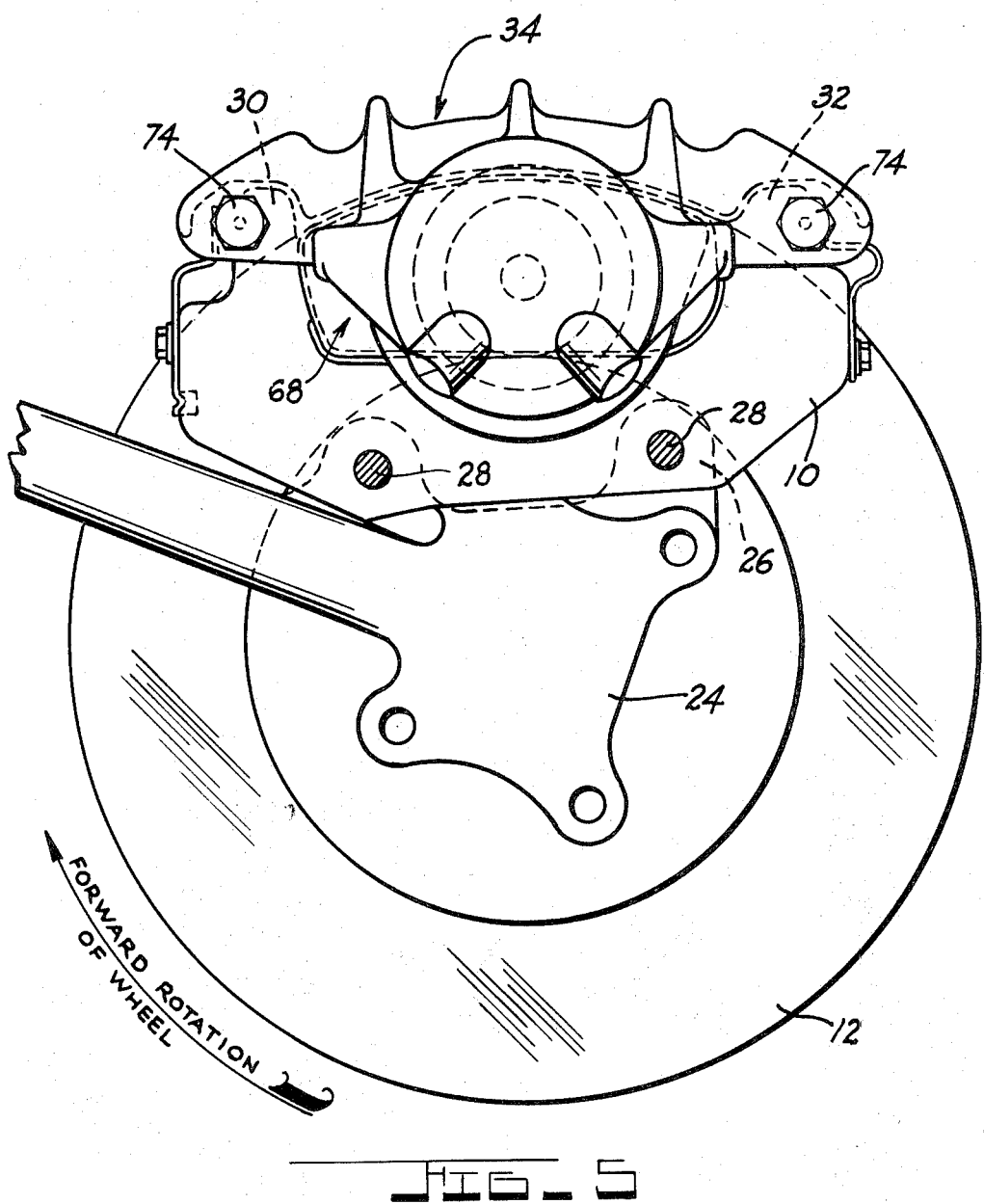

Patented Oct. 6, 1970
3,532,191
Sheet 5 of 5
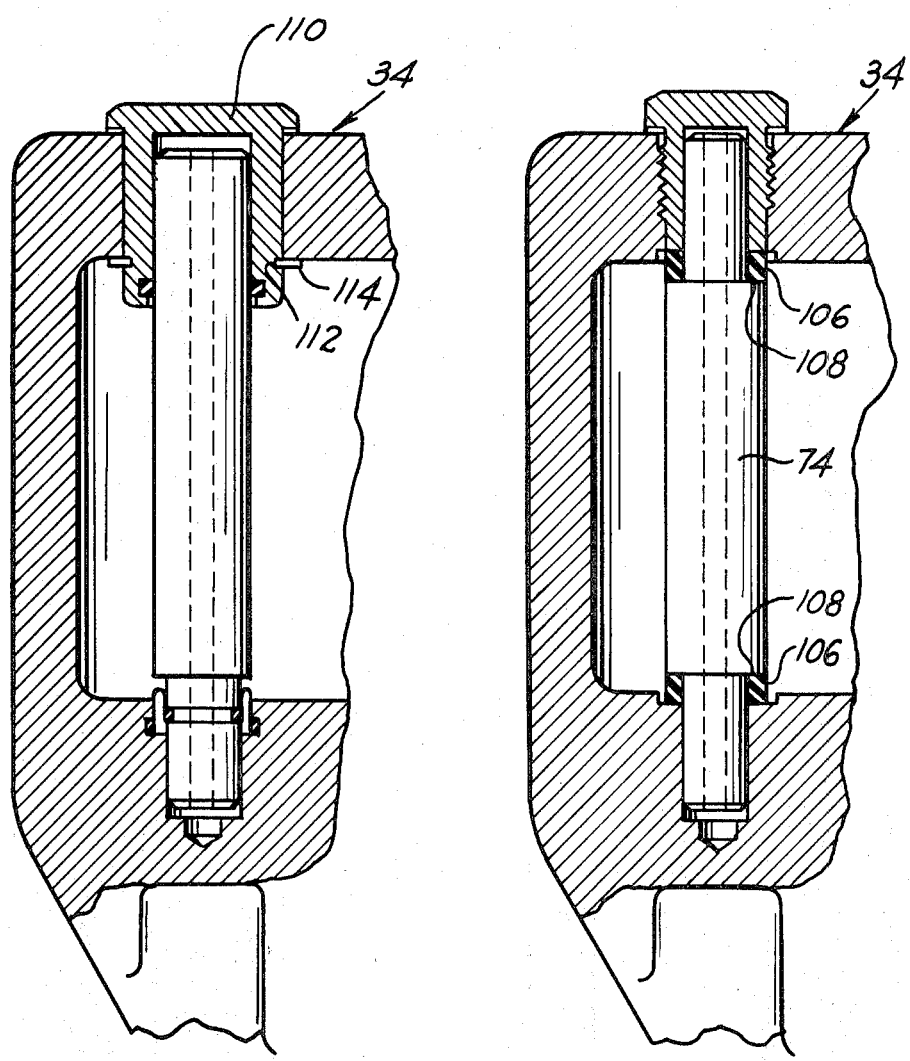
FIG_7   FIG_8
INVENTORS
**RICHARD T. BURNETT.
ALFRED WESSTROM.**
BY
Plante, Arens, Hartz and O'Brien
ATTORNEY.

3,532,191

ADJUSTABLE BEARING MEANS FOR A DISC BRAKE

BACKGROUND OF THE INVENTION

This invention concerns an improvement to disc brakes of the type having a housing which straddles a rotor or disc with friction lining members being closely maintained adjacent the rotor surfaces, wherein the housing is operatively connected to a torque taking member by a bearing means or pin member. The pin member is further, resiliently preloaded against the torque taking member.

Disc brakes of the type to which this invention relates have been employed quite generally for passenger vehicle requirements; however, the invention has applications on all types of vehicles. Additionally, the invention herein disclosed is an improvement over U.S. Pat. No. 3,388,774 and copending application having the same assignee, Ser. No. 612,238, now U. S. Pat. No. 3,410,371.

SUMMARY OF THE INVENTION

It is an important object of this invention to provide a floating head or housing type of disc brake which insures minimum pedal travel at all times by maintaining the friction elements adjacent the rotor surfaces.

It is an object of this invention to provide a floating-head-type disc brake which guarantees parallel friction lining wear.

It is an object of this invention to provide a floating-head-type disc brake having a housing which straddles a rotor member and is slidingly carried on a torque taking member for free sliding action up to a given amount toward and away from the rotor surface to compensate for lateral rotor displacement but resisting further movement beyond said given amount by a predetermined resistive force which when overcome repositions said housing with respect to said torque taking member.

It is an object of this invention to provide novel connecting means between a torque taking member and a floating head caliper which allows for free sliding action between the housing and torque taking member up to a given amount in order to permit the housing to adjust to accommodate for lateral rotor displacement against the friction elements but resisting said free sliding action of said housing beyond said given amount by a predetermined resistive force which when overcome repositions said housing with respect to said torque taking member.

It is an object of this invention to provide sealing means intermediate a floating head caliper housing and bearing means or pins on which it is carried.

It is an object of this invention to provide independent spring means for each bearing means or pin to adjustably secure said pin against a torque taking member.

It is an object of this invention to provide a caliper disc brake which is simple in construction and economical to manufacture, and still does not sacrifice performance.

Other objects and features of the invention will be apparent from the following description of the adjustable bearing means for a disc brake taken in connection with the accompanying drawings.

BRIEF DESCRIPTION OF THE DRAWINGS

FIG. 1 is an elevational front view of the invention taken from the outboard side as mounted on a vehicle;

FIG. 2 is a sectional view taken along line 2-2 of FIG. 1;

FIG. 3 is a top plan view of the brake of FIG. 1 with sections cut away, illustrating certain novel aspects of the brake;

FIG. 4 is an enlarged fragmentary sectional view of one of the broken away portions of FIG. 3;

FIG. 5 is a side elevational view of the brake of the invention taken from the inboard side;

FIG. 6 is an enlarged fragmentary sectional view of one of the broken away portions of FIG. 3, showing a modified form of the invention;

FIG. 7 is an enlarged fragmentary sectional view of a modified form of the bushing shown in FIG. 4; and FIG. 8 is an enlarged fragmentary sectional view of a modified form of the seal means depicted in FIG. 4.

DESCRIPTION OF THE PREFERRED EMBODIMENTS

Referring now to the drawings, there is illustrated a torque taking member 10 located on one side of a rotor or disc 12, the latter of which is formed with annular opposed friction faces or surfaces 14 and 16. The rotor is securely fastened to a wheel 18 and hub 20 by bolts 22. The torque taking member is secured to a fixed part of a vehicle, in this case, a spindle 24 having mounting bosses 26, by bolts 28 which extend through the torque member and mounting bosses for engagement with the spindle. The torque taking member 10, being suitably secured to the stationary part of the vehicle, is further comprised of a pair of circumferentially spaced arms 30 and 32, as best shown in FIG. 5. The arms 30 and 32 are integral with the torque taking member 10. A housing 34 straddles the disc and is slidably mounted on the torque taking member 10 for movement in a direction transverse to the rotor faces, i.e., in a direction along the axis of said disc toward and away from said disc faces. The housing 34 includes an inwardly radially extending portion 36 overlying a portion of one of said rotor faces and another portion 38 extending radially inward on the other side of said rotor face and overlying a portion only of said rotor face. The radial portions 36 and 38 are joined together by a bridge member 40 to thereby provide a housing made of a single casting. In order to impart transverse movement to said housing, an actuator 42 is located in the radially inward extending portion 36, comprising a piston 44 slidably received in a bore 46. A seal 48 is located in a groove 50 of the bore 46 to seal chamber 52 against the escape of fluid through the open end of the bore. The open end of the bore 46 is sealed to preclude the entry of foreign matter by a rubber boot 54 which has one end connected to the housing 34 and its other end connected to the piston 44.

Hydraulic pressure from a master cylinder, not shown, is communicated to chamber 52 through an inlet port 56. A first friction element 58 is carried by the radial portion 38 of the housing 34 and lies adjacent one face of the disc in proximate relationship thereto. The friction element 58 is removably attached to the radial portion 38 by inserting projections 60 formed integral with the friction element into openings 62 of said radial portion 38. As can be best seen in FIG. 2, the friction element 58 includes a backing plate 64 and friction lining 66.

As illustrated best in FIGS. 2 and 5, the torque taking member 10 which forms a fixed part of the vehicle, slidably supports a second friction element 68 carried between the circumferentially spaced arms 30 and 32 for frictional engagement with a side of the disc face opposite to the side engaged by said first friction element 58. The friction element 68 includes a backing plate 70 and a friction lining 72. As will be understood by those skilled in the art, the friction elements 58 and 68 might well be of one-piece construction if the friction material used were sufficiently adequate structurally to take the compressive and bending forces without the assistance of the backing plates.

As can be seen in FIG. 2, the piston 44 of the actuator is positioned adjacent the friction element 68 for moving same into frictional engagment with the disc 12 upon energization of the fluid motor or actuator 42. The housing 34 straddles the disc 12 with the radially extending portions 36 and 38 adapted to overlie the opposed faces of the disc 12. The friction elements 58 and 68 are interposed between opposed faces of said disc and the respective radial portions 36 and 38 of the housing 34. The actuator 42 is operatively connected to the friction element 68 through the piston 44 and to the friction element 58 through the housing 34 so that pressurization of the chamber 52 imparts movement to the friction elements 58 and 68 causing them to frictionally engage the faces of rotor 12. The housing 34 straddles the disc 12 and is supported on the torque taking member 10 by bearing members or pins 74 which provide for sliding movement of said housing with respect to torque taking member in a direction transverse to said disc faces, as may best be seen in FIGS. 1, 3, and 5. The pins 74 connect each of the circumferentially spaced arms to the housing 34 to provide for sliding action transverse to the rotor or disc faces, allows a given amount of free movement of said housing with respect to said torque taking member in order to accommodate the housing to the lateral displacement of the rotor or disc acting against the friction elements, but offering a predetermined resistive force to further movement of said housing with respect to said torque taking member when movement of said housing is in excess of said given amount of movement which, when overcome, repositions said housing with respect to torque taking member.

Referring specifically now to FIGS. 3 and 4, the pins 74, slidably connecting the housing 34 to the torque taking member 10, further include, an axial bore 76 extending from end to end and radially extending passages 78. The housing 34 further includes bushings 80 suitably affixed to the housing with threaded portions and lock washers 82. The housing includes bores 84 in which the pins 74 are slidably installed. The fit between the ends of the pins 74 and the closed ends of the bores 84 is such that the housing 34 can slide freely on the pins 74. The radially extending portions 36 and 38 of the housing 34 are suitably formed on the other side of the housing 34 in spaced parallel relationship to provide spaces 86 so as to accommodate the circumferentially spaced arms 30 and 32 which support the pins 74, which in turn, form bearing members between the housing and the torque taking member. More specifically, the ends of the pins 74 are in a spaced relationship to the closed ends of the bores 84 for engagement with the closed ends of the bores as the housing 34 slides on the pins 74 in a direction transverse to the disc faces. With reference now to FIG. 1, the arms 30 and 32 are provided with openings 88 and 90, respectively, for receiving the pins 74. The spacing between the openings 88 and 90 of the circumferentially spaced arms 30 and 32, is such that when the pin 74 is in frictional engagement with the inner edge of opening 88, there is a space C' D' between the inner surface of opening 90 and the adjacent side of pin 74. However, the spacing of the openings 88 and 90 with respect to the circumferential spacing of the pins 74 in the housing is such that the housing is locked to the torque taking member by these pins 74. It will be observed that any attempt to rotate the housing about the pin on the right side as viewed in FIG. 1, will rotate the pin 74 on the left into engagement with circumferentially spaced arm 32. Assembly of the housing to the torque taking member may be accomplished by positioning one of said pins 74, for example the one on the right in FIG. 1, in its respective bores of the housing 34 and the opening 88 of the torque taking member, and then rotating the housing until the bores in the housing on the opposite side of the housing, as seen on the left in FIG. 1, are in alignment with the other opening 90 of the torque taking member at which time the other pin 74 is pushed into the aligned holes, and the bushing 80 is suitably installed to preclude the pin from coming back out.

The space C' D' is, of course, due to a stackup of tolerances during the manufacturing of the various components. A leaf spring 92 has one end securely attached to the torque taking member 10 by a bolt 94. The other end of the spring 92, which is the free end, rides on the outer suface or periphery of the pin 74 to thereby urge or preload the pin into a bearing relationship to the arm 30 and also urging the housing 34, which is carried by the pin 74, in a counterclockwise direction with respect to FIG. 1, causing the gap C' D'.

A second leaf spring 96 is mounted on the torque taking member 10 on the opposite end of the torque taking member from the spring 92 by a bolt 98. The free end of the second spring 96 is mounted so as to engage the underside of the pin 74, thereby urging or preloading the pin, together with the housing 34 which is carried by the pin, upwardly against the circumferentially spaced arm 32 creating the space E' F' between the underside of the pin and the lower inner surface of the opening 90 in the arm 32. This spring likewise acts as an antirattle spring intended to compensate for a stackup of tolerances existing between the diameter of the pin 74 and the diametrical opening 90.

In addition to functioning as antirattle springs, the springs 92 and 96 urge the pins 74 into engagement with their respective circumferentially spaced arms 30 and 32. This preload by the springs 92 and 96 on the pins 74 adjustably secures the pins in their respective arms. The springs 90 and 96 are preselected so as to apply sufficient loading on the pins 74 in their respective arms to resist sliding movement by the pins with respect to the torque taking member 10 up to a predetermined force imparted to the ends of the pins due to transverse movement of the housing 34 as a result of excessive disc displacement or due to normal friction lining wear which will cause the pins 74 to slide in their respective arms to thereby reposition the housing 34 with respect to the torque taking member 10.

In assembling the torque taking member 10 and housing 34 to a vehicle wheel, the bearing members or pins 74 are positioned in their respective circumferentially spaced arms 30 and 32 so that substantially equal spacing A' B' and A' C' between the ends of the pins 74 and the closed ends of the bores 84 exists as best seen in FIG. 3. With the spacings A' B' and A' C', any normal lateral rotor displacement during nonbraking conditions will only shift the housing 34 transversely with respect to the disc faces taking up the spaces A' B' or A' C' on the respective pins 74. This sliding action of the housing 34 on the pins 74 is substantially free of any resistive force, except for friction between the bearing members or pins 74 and the bores 84 of the housing in which they slide. Specifically, the housing shifts freely back and forth transversely of the disc until such time as the housing engages the ends of the pins 74 with sufficient force to overcome the preload of the springs on said pins 74, at which time the pins are shifted in a sliding fashion on the torque taking member to thereby reposition the housing. This shifting or sliding of the pins will take place upon friction pad wear or lateral disc displacement beyond an amount in excess of the spacings A' B' and A' C'. It is important that the housing be repositioned transversely to the disc surfaces due to lining wear so as to maintain the friction elements 58 and 68 in close proximity to the disc faces to thereby maintain fluid displacement in chamber 52 to a minimum, thus maintaining minimum pedal travel.

At the time of assembly of the pins 74 in the housing 34 and bushings 80, annular seals 100 are suitably installed in grooves 102 of the bores 84 and frictionally positioned with respect to pins 74 to retain lubricant 104 between the pins 74 and the surfaces of the bores 84 on which they slide as well as prevent dirt and other contaminants from entering between these parts to thereby ensure sliding action at all times. As can be best seen in FIG. 4, the axial bore 76 and radially extending passages 78 provide for flow of the lubricant back and forth from one end of the pins 74 in response to the deflection of the housing 34 by the disc.

Referring now briefly to FIG. 8, annular seals 106 of the sponge rubber variety may be suitably installed intermediate the housing 34 and annular ridges 108 of the pins 74. The type of seal shown may frictionally and sealingly engage the axial portion of the pin 74 as well as the annular ridge 108 and surface of the housing 34 against which it abuts.

Referring now to FIG. 7, a modified bushing 110 is shown as a replacement for bushing 80 shown in FIG. 3. Instead of being threadably installed in the housing 34 and locked by means of a lock washer, the modified bushing 110 has an annular grove 112 for receiving a C-ring retainer 114 which secures it in place with respect to the housing 34. The functional relationship of the pin 74 with respect to the closed end of the bore internal to the modified bushing 110 remains the same as hereinabove discussed.

Referring now to FIG. 6, a housing 116, being otherwise identical to the housing 34 discussed hereinabove, has axially aligned bushings 118 and 120 having axial projections 122 and 124, respectively, for sliding cooperation with pins 126 having bores 128 and 130. As may be seen from the drawing, bores 128 and 130 slidably cooperate with axial projections 122 and 124, respectively, with the bores having a spaced apart relationship with respect to the ends of the axial projections 122 and 124. These spacings are again identified as A' B' and A' C', as shown before in FIG. 3. Seals 132 are provided between the pins and bushings to maintain internal lubrication and preclude the entry of exterior contaminants. With the spacings A' B' and A' C', as shown in FIG. 6, any normal lateral rotor displacement during nonbraking conditions will only shift the housing transversely with respect to the rotor faces taking up the spaces A' B' and A' C' on the respective pins 126. The operational relationship between the pins 126 and the torque taking member 10, remains identical to that described above, shown in FIG. 3.

MODE OF OPERATION OF THE PREFERRED EMBODIMENTS

With the direction of rotation of the rotor or disc 12 in a clockwise direction, as indicated in FIG. 5, pressurization of chamber 52 (see FIG. 2) will move the piston 44 and associated friction element 68 to the left, and the housing 34 and associated friction element 58 to the right, thereby clamping the rotor or disc 12 between the two friction elements. Specifically, this clamping effect of the friction elements on the rotor 12 is brought about by pressurization of the fluid in chamber 52. The pressure buildup in chamber 52 acts on the backside of the piston 44 urging it to the left and on the end wall 36 of the housing 34 causing it to slide on the pins 74, thus bringing the opposed friction elements 58 and 68 into frictional engagement with the rotor faces.

It is to be noted that if the amount of transverse movement of the housing 34 on the pins 74, in response to a brake application, does not exceed the spacing A' B' so that the housing 34 does not engage the ends of the pins 74, the pins 74 will not be shifted in their respective arms against the preload of the springs 92 and 96 (see FIG. 3). However, if a sufficient number of brake applications should produce measurable wear on the friction element 58, such that the housing 34 engages the ends of the pins 74 with sufficient force of impact to overcome the preload between the pins 74 and the torque taking member 10, the pins will shift in their respective circumferentially spaced arms, thus causing the housing 34 to be repositioned on the torque taking member 10. This action, which causes the housing to shift transversely an amount in excess of the spacing A' B', compensates for wear of lining member 66 to thereby maintain fluid displacement, hence, pedal travel, to a minuimum at all times. As to the wear on lining 72 of friction element 68, brake lining wear is compensated for by establishing a dimensional relationship with the diameter of the piston 44, the bore 46, the size of seal 48 and the dimensions of the groove 50, such that the magnitude of the frictional contact force between the seal 48 and the piston 44 controls the position of the piston in each new position as it moves to the left against the rotor if there has been lining wear. This dimensional relationship of the parts is such that the piston 44 will at all times be maintained to the left in FIG. 2, which again keeps fluid displacement, hence, pedal travel, to a minimum. The arrangement of the seal 48 in groove 50 is such that upon release of pressure from the chamber 52, the seal 48, which has been stressed in the groove 50 by the piston as it moves to the left, will return the piston to the right a slight amount due to the return of the seal 48 to its unstressed condition. This keeps the lining 72 in the same relationship to the rotor at all times. Should a brake application produce wear on lining 72 which causes the piston to overcome the frictional force between the seal and piston, the piston will merely slide in the seal the required amount to compensate for wear. In this event, the piston will likewise be returned to the right a slight amount due to the return of the seal to its unstressed position.

Although the invention has been illustrated and described in connection with certain embodiments, various other adaptations of the invention will become apparent to those skilled in the art. It is my intention to include within the scope and spirit of this invention all equivalent structures whereby the same or substantially the same results will be obtained.

We claim:
1. A disc brake comprising:
a rotor having two friction faces, one on each side of the rotor;
a torque taking member located at one side of said rotor and having circumferentially spaced arms;
caliper means straddling said rotor;
a pair of friction elements one located adjacent each of said friction faces and operatively connected to said caliper means for frictional engagement with said faces;
pin means slidably carried by said circumferentially spaced arms to connect said caliper means and said torque taking member and provide for sliding movement of said caliper means with respect to said torque taking member in a direction tranverse to said faces;
said caliper means slidably carried by said pin means;
one of said means having a blind bore formed therein; and
the other means including a portion slidably received in said blind bore adapted to engage the end of the latter upon transverse movement of the caliper means in excess of a predetermined distance for sliding the pin means on the circumferentially spaced arms to reposition said caliper means transversely of the friction faces to compensate for wear of the friction elements.
2. The structure as recited in claim 1, wherein said pin means are spring loaded laterally to said sliding movement of said pins for sliding adjustment on said torque taking member.
3. The structure as recited in claim 1, wherein said caliper means includes bushing means which slidably receives said pin means.
4. The structure recited in claim 1, wherein said one means is said caliper means, the other means being the pin means.
5. The structure recited in claim 1, wherein said one means is the pin means, the other means being the caliper means.
6. The structure as recited in claim 1, further including a seal means disposed between said caliper means and said pin means to preclude contaminants from interfering with sliding action therebetween.
7. The structure as recited in claim 6, wherein said seal means is an annular sponge rubber seal.
8. The structure recited in claim 6, wherein said seal means is operatively secured to said pin means and said caliper means to provide for a rolling action so as to follow the sliding action of the caliper means relative to said pin means.
9. The structure as recited in claim 6, wherein said pin means include an axial bore from end to end for communication of lubricant therebetween.
10. The structure as recited in claim 9, wherein said axial bore has radially extending passages to communicate said lubricant to variable volume chambers defined by said caliper means, said pin means and said seal means.